United States Patent [19]

Monnerat et al.

[11] 4,341,658
[45] Jul. 27, 1982

[54] CATALYST FOR REACTING PHENOLIC HYDROXYL GROUPS WITH EPOXY GROUPS

[75] Inventors: Georgia A. Monnerat; George E. Ham; Thomas J. Hairston, all of Lake Jackson, Tex.; Melvin J. Hatch, Socorro, N. Mex.

[73] Assignee: The Dow Chemical Co., Midland, Mich.

[21] Appl. No.: 214,936

[22] Filed: Dec. 10, 1980

Related U.S. Application Data

[62] Division of Ser. No. 139,071, Apr. 10, 1980, Pat. No. 4,276,406.

[51] Int. Cl.$^3$ ............... B01J 31/08; B01J 31/26; B01J 29/04
[52] U.S. Cl. .................. 252/428; 252/430; 252/455 Z
[58] Field of Search ............ 252/430, 455 Z, 428

[56] References Cited

U.S. PATENT DOCUMENTS

| | | | |
|---|---|---|---|
| 3,036,986 | 5/1962 | O'Connor et al. | 252/430 X |
| 3,048,552 | 8/1962 | Fang | 252/430 X |
| 3,954,883 | 5/1976 | Haag et al. | 252/430 X |

Primary Examiner—Carl F. Dees
Attorney, Agent, or Firm—J. G. Carter

[57] ABSTRACT

Catalysts for reacting vicinal epoxides with an aromatic hydroxyl-containing material result from the treatment of a solid substrate containing a plurality of ion-exchangeable cations with a polymer containing a multiplicity of quaternary onium cations in association with a reactive anion such that after treatment, there remains a sufficient quantity of the quaternary onium cations in association with the reactive anion to catalyze the reaction. These catalysts reduce the quantity of side reactions.

8 Claims, No Drawings

CATALYST FOR REACTING PHENOLIC HYDROXYL GROUPS WITH EPOXY GROUPS

CROSS-REFERENCE TO RELATED APPLICATION

This is a divisional of application Ser. No. 139,071, filed Apr. 10, 1980, now U.S. Pat. No. 4,276,406.

BACKGROUND OF THE INVENTION

Commercial processes for coupling epichlorohydrin and a bisphenol rely on the use of soluble catalysts (U.S. Pat. Nos. 2,772,296 and 3,477,990; French specification No. 1,286,345) or alkaline substances (U.S. Pat. Nos. 2,801,227, 2,986,552 etc.; Belgian specification No. 518,057). However, the use of inorganic bases like caustic produces undesirable by-products and the soluble catalysts must be removed from the final resinous product, which represents an economic loss of effort spent in removing and disposing of catalyst used only once.

Anionic exchange resins have been previously reported as non-soluble catalysts for the coupling of epichlorohydrins and polyhydric phenols (U.S. Pat. No. 3,372,142). The use of these highly crosslinked polymers results in higher levels of undesirable by-products than the soluble catalyst counterpart e.g. benzyltrimethylammonium chloride—a soluble catalyst vs. MSA-1—a macroporous strong anion exchange resin with 4-benzyltrimethylammonium chloride groups as the active specie.

We have developed a catalyst which is not only insoluble but also eliminates the formation of the higher levels of impurities observed with the use of the highly crosslinked anionic exchange resins.

SUMMARY OF THE INVENTION

The present invention concerns a catalyst composed of (A) a solid substrate containing a plurality of ion-exchangeable cations treated with (B) a polymer containing a plurality of quaternary onium cations associated with a reactive anion; wherein components (A) and (B) are employed in quantities such that the resultant catalyst contains quaternary onium cation-anion sites.

The present invention also concerns a process for reacting phenolic hydroxyl containing compounds with vicinal epoxy-containing compounds which process comprises conducting the reaction in the presence of the aforementioned catalyst.

Suitable solid substrates which contain a multiplicity of ion-exchangeable cations include both organic and inorganic substrates.

Suitable organic substrates include the ion-exchange resins such as, for example, macroporous or macroreticular strong cationic exchange resins prepared from copolymers of styrene and divinyl benzene such as DOWEX ® MSC-1 manufactured by The Dow Chemical Company and AMBERLITE ® 200 manufactured by Rohm and Haas, mixtures thereof and the like.

Particularly suitable ion-exchange resins include, for example, DOWEX ® MSC-1.

Suitable polymers containing a multiplicity of quaternary onium cations include, for example, those polymers prepared from one or more polymerizable monomers such as, for example, diallyl dimethylammonium chloride, vinyl benzyltrimethylammonium chloride, 2-(trimethylammonium)ethyl acrylate or methacrylate, mixtures thereof and the like.

Suitable onium cations include, for example, ammonium, phosphonium, sulfonium, mixtures thereof and the like.

Particularly suitable polymers containing quaternary onium cations include, for example, poly(diallyl dimethylammonium chloride), poly(vinyl benzyl trimethylammonium chloride), mixtures thereof and the like.

Particularly suitable anions which are associated with the polymer containing a multiplicity of ion-exchangeable cations include, for example, $SO_3^-$ and other anions which are weakly nucleophilic such as fluoro alkyl carboxylate anions.

The solid substrates such as is employed herein are well known articles of commerce.

The polymers containing a multiplicity of quaternary onium cations associated with a reactive anion can be prepared in the following manner: Either (1) a monomer composed of both the desired active group and also of a group capable of undergoing polymerization e.g. vinyls or allyls, or (2) a mixture of an active monomer and a non-active monomer or linear polymer which can undergo polymerization together may be heated under the appropriate conditions with the appropriate catalyst to induce polymerization or, alternatively, a long chain uncrosslinked polymer, like polyethyleneimine could be quaternized. (However, this should not be construed to limit this invention to the methods described above.) Polymer may also be obtained commercially from The Dow Chemical Company and from the Calgon Corporation.

In the preparation of the catalysts of the present invention, the solid substrate containing a plurality of ion-exchangeable cations are treated, i.e. contacted, with a polymer containing a plurality of quaternary onium cations in association with a reactive anion in proportions that there remain a sufficient number of quaternary onium cations in association with a reactive anion to function as a catalyst. Usually, the components are contacted in proportions such that there is at least about 1, preferably at least about 4, quaternary onium cations in association with a reactive anion contained in said polymer for each exchanged cation contained in said substrate. The treatment or contact can be performed at temperatures of from about 15° C. to about 150° C. (but below the decomposition temperature of both the substrate and onium containing polymer) either in the presence or absence of a suitable medium such as, for example, water, methanol, ethanol, propanol, dioxane, tetrahydrofuran, mixtures thereof and the like.

Suitable aromatic hydroxyl-containing compounds and vicinal epoxy-containing compounds the reaction of which is catalyzed by the catalyst of the present invention are suitably described in U.S. Pat. No. 3,477,990 (Dante et al.) and U.S. Pat. No. 3,948,855 (Perry) both of which are incorporated herein by reference.

The following examples are illustrative of the present invention, but are not to be construed as to limiting the scope thereof in any manner.

The abbreviations employed in the examples have the following meaning.

PVBTMAC refers to poly(vinylbenzyltrimethyl ammonium chloride).

MSC-1 refers to a strong acid macroporous cation exchange resin prepared by the nuclear sulfonation of a copolymer of styrene and divinylbenzene commercially available from The Dow Chemical Company as DOWEX ® MSC-1.

*BTMAC* refers to benzyltrimethyl ammonium chloride.

*PDADMAC* refers to poly(diallyldimethylammonium chloride).

*ZEOLITE* 13X refers to a synthetic zeolite of the composition $Na_{86}[(AlO_2)_{86}(SiO_2)_{106}]\cdot 264H_2O$ commercially available from Linde Division of the Union Carbide Corporation.

*DCOPP* refers to 2-chloro-1(chloromethyl)ethyl glycidyl ether.

*DCOPPCH* refers to 2-chloro-1(chloromethyl) ethyl 3-chloro-2-hydroxypropyl ether.

EXAMPLE 1

Preparation of PVBTMAC on MSC-1

Two hundred grams of MSC-1 (NA+ form) beads were washed four times in hot (80°-100° C.) deionized water. The washed beads were stirred with 649 grams of 33% (aq) PVBTMAC for three hours at ambient temperatures and were then washed with water until the effluent tested negative for chloride ion. The beads were then stirred for one hour in 328 grams of PVBTMAC solution and the wash step repeated. The MSC-1/PVBTMAC beads were then rinsed four times with acetone and dried in a vacuum oven.

EXAMPLE 2

Preparation of MSC-1 Treated with PDADMAC

Three hundred grams (1.41 equivalents) of MSC-1 (Na+ form) were washed four times in 1500 ml hot deionized water. The washed beads were then refluxed for one hour with 1641 grams of a 15% (aq) PDADMAC solution (1.52 equivalents). The beads were then washed three times with 1500 ml of deionized water so that the aqueous effluent tested negative for chloride ion. The above ion-exchange and wash steps were repeated twice, once with 1620 grams PDADMAC and finally with 1510 grams PDADMAC. The MSC-1/PDADMAC beads were finally washed four times with 1000 ml acetone and dried in a vacuum oven.

EXAMPLE 3

Preparation of Catalysts on an Inorganic Support

Ten grams of zeolite 13X previously rinsed with about 100 ml $H_2O$ were added to 90.65 grams of a 33% aqueous solution of PVBTMAC. This was refluxed for two hours. The liquid was drained off and the zeolite was water washed until the effluent tested negative for chloride ion. This ion-exchange and the subsequent wash were repeated two times. The Zeolites were acetone rinsed and dried in a vacuum oven.

EXAMPLE 4

Comparison of BTMAC, MSC-1/PVBTMAC, zeolite 13X/PVBTMAC and MSA-1—Batch Runs

Run A: Eighty grams (0.865 mole) of epichlorohydrin, twenty grams (0.088 mole) of parabisphenol A and 0.42 gram (0.00136 mole) of a 60% aqueous solution of BTMAC were heated at 65° C. while being stirred.

Run B: Eightly grams of epichlorohydrin, twenty grams of parabisphenol A and ten grams of prepared MSC-1/PVBTMAC catalyst were heated at 65° C. while being stirred (catalyst preparation as in example 1).

Run C: Ten grams of washed and dried MSA-1 beads (Cl− form) were heated with eighty grams of epichlorohydrin and twenty grams of parabisphenol A at 65° C. while being stirred.

Run D: 5.625 grams of zeolite 13X/PVBTMAC catalyst prepared in example 3 was heated at 65° C. with 11.25 grams of parabisphenol A (0.0493 mole) and 45 grams of epichlorohydrin (0.478 mole) while being stirred.

| Run | Catalyst | % Conversion of Phenolic OH | Reaction Time Hours | % DCOPP + % DCOPPCH |
|---|---|---|---|---|
| A | BTMAC (soluble) | 98.8 | 29.5 | 0.10 |
| B | MSC-1/ PVBTMAC | 99.2 | 142.75 | 0.12 |
| C | MSA-1 | 99.1 | 256.5 | 0.21 |
| D | Zeolite 13X/ PVBTMAC | 96.7 | 378.5 | |

EXAMPLE 5

Use of Monomeric BTMAC on MSC-1 Bead

Catalyst preparation: To fifteen grams of water washed and dried MSC-1 beads were added 46.9 grams of a 60% aqueous BTMAC solution. The mixture was refluxed for two hours, the liquid filtered off and the beads washed until the effluent tested negative for chloride ion. The above ion-exchange and wash procedure was repeated two times at ambient temperatures. The beads were then rinsed three times with acetone and dried in a vacuum oven at 68° C. and 21-inch Hg.

MSC-1/BTMAC Run #1: Ten grams of the prepared catalyst, twenty grams of parabisphenol A (0.088 mole) and eighty grams of epichlorohydrin (0.865 mole) were heated together at 65° C. while being stirred.

MSC-1/BTMAC Run #2: The liquid from the above run was filtered off the catalyst which was then washed with acetone and dried. The above run was then repeated reusing the catalyst of run #1.

MSC-1/BTMAC Run #3: Repeat of run #2 reusing the same catalyst beads.

MSC-2/BTMAC Run #4: Repeat of run #3 reusing the same catalyst beads.

The above runs were repeated at 60° C. using MSC-1/PVBTMAC catalyst prepared as in example 1.

| | COMPARATIVE MSC-1/BTMAC | | PRESENT INVENTION MSC-1PVBTMAC | |
|---|---|---|---|---|
| Run | Hours | % Conversion of Phenolic OH | Hours | % Conversion of Phenolic OH |
| 1 | 43.5 | 98.14 | 49 | 88.1 |
| 2 | 46.75 | 98.0 | 41 | 66.4 |
| 3 | 50 | 97.5 | 46.5 | 68.2 |
| 4 | 65 | 34.1 | 45.5 | 70.6 |

EXAMPLE 6

Continuous Coupling Epichlorohydrin and Bisphenol A

Catalyst preparation:

MSC-1/PVBTMAC catalyst prepared in example 1 was used for the continuous coupling reaction.

MSA-1 catalyst was washed in a hot (80°-100° C.) deionized water, rinsed with acetone and dried in a vacuum oven. The dried beads were then soaked 24 hours in a 96–97% coupled epi/parabisphenol A mixture to eliminate later swelling in the reactor. The increase in volume of the MSA-1 beads upon soaking was 60%.

Reactor description:

The reactor consisted of a 12"×1¼" stainless steel pipe with screwed cap ends. A Milton Roy Instrument mini-pump was used to feed a 20% solution of parabisphenol A in epichlorohydrin down through the reactor. A ten-pound check valve provided back pressure on the system.

| Run Conditions | PRESENT INVENTION MSC-1/ PVBTMAC | COMPARATIVE MSA-1 |
|---|---|---|
| Wt. dried beads in reactor, gm | 170.1 | 78.1 |
| Approx. vol. liquid loaded into Rx., ml | 50 | 40 |
| Temperature, °C. | 60 | 60 |
| Flowrate, ml/min. | .5 | .5 |
| % conversion | 91.3 | 94–97 |
| % DCOPP-DCOPPCH | 0.17 | 0.29 |

From example 4 it is apparent that the surface catalysis of the coupling reaction using a polymer quaternary ion-exchanged to an essentially inert substrate produces less DCOPP than the use of permeable anionic exchange resins with active sites throughout the resin.

Example 5 demonstrates that ion-exchanged single unit quats are essentially removed from the substrate after only three batch runs.

We claim:

1. A catalyst resulting from the treatment of (A) a solid substrate containing a plurality of ion-exchangeable cations treated with (B) a polymer containing a plurality of quaternary onium cations associated with a reactive anion; wherein components (A) and (B) are employed in quantities such that the resultant catalyst contains quaternary onium cation-anion sites.

2. The catalyst of claim 1 wherein component (A) is a cation exchange resin.

3. The catalyst of claim 2 wherein said cation exchange resin is macroporous.

4. The catalyst of claim 1 wherein component (A) is an inorganic substrate.

5. The catalyst of claim 4 wherein said inorganic substrate is a zeolite.

6. The catalyst of claims 1, 2, 3, 4 or 5 wherein said quaternary onium cations are ammonium, phosphonium, sulfonium or a mixture thereof and wherein said reactive anion has a nucleophilic constant greater than 2.5.

7. The catalyst of claim 6 wherein said reactive anion is a halide.

8. The catalyst of claim 7 wherein component (B) is poly(vinylbenzyltrimethyl ammonium chloride) or poly(diallyldimethyl ammonium chloride).

* * * * *